United States Patent
Chen

(10) Patent No.: US 8,610,403 B2
(45) Date of Patent: Dec. 17, 2013

(54) CHARGING CRADLE

(75) Inventor: Chao Chen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 262 days.

(21) Appl. No.: 12/955,056

(22) Filed: Nov. 29, 2010

(65) Prior Publication Data

US 2012/0133328 A1 May 31, 2012

(51) Int. Cl.
*H02J 7/00* (2006.01)

(52) U.S. Cl.
USPC ............................ 320/115; 320/107; 320/113

(58) Field of Classification Search
USPC .......................................................... 320/115
See application file for complete search history.

(56) References Cited

U.S. PATENT DOCUMENTS

| | | | |
|---|---|---|---|
| 6,002,921 A * | 12/1999 | Pfahlert et al. | 455/575.9 |
| 6,400,969 B1 * | 6/2002 | Yamashita et al. | 455/573 |
| 6,509,715 B1 | 1/2003 | LaRue | |
| 7,710,071 B2 | 5/2010 | Elizalde Rodarte | |
| 7,956,577 B2 * | 6/2011 | Fujii et al. | 320/114 |
| 8,269,454 B2 * | 9/2012 | Yang | 320/107 |
| 2003/0085686 A1 * | 5/2003 | Haga et al. | 320/112 |
| 2005/0225294 A1 | 10/2005 | Bozzone et al. | |
| 2006/0261778 A1 | 11/2006 | Elizalde Rodarte | |
| 2010/0072944 A1 * | 3/2010 | Griffith et al. | 320/107 |
| 2010/0173674 A1 | 7/2010 | Fujii et al. | |
| 2011/0084649 A1 * | 4/2011 | Yang | 320/107 |

FOREIGN PATENT DOCUMENTS

| | | |
|---|---|---|
| DE | 102004044089 A1 | 4/2006 |
| EP | 1998423 A2 | 12/2008 |
| EP | 2073338 A1 | 6/2009 |
| EP | 2112740 A2 | 10/2009 |

OTHER PUBLICATIONS

European Search Report from corresponding EP Application dated May 26, 2011.

* cited by examiner

*Primary Examiner* — Arun Williams
(74) *Attorney, Agent, or Firm* — Gowling Lafleur Henderson LLP

(57) ABSTRACT

A charging cradle for a rechargeable medium having a charging contact. The charging cradle including a cradling-body, which includes a receiving area shaped to receive the rechargeable medium; a charging circuit having a charging and a non-charging state; a charging contact electrically coupled to the charging circuit and positioned to be alignable with the charging contact of the rechargeable medium; and a switch coupled to the cradling-body for interacting with the rechargeable medium to place the charging circuit in the charging state or the non-charging state. When the rechargeable medium is fully inserted into the receiving area such that the charging contact of the rechargeable medium is aligned with the charging contact of the cradling-body, the rechargeable medium, via the switch, places the charging circuit in the charging state, and when the rechargeable medium is not fully inserted, the switch places the charging circuit in the non-charging state to prevent short-circuiting of the charging circuit.

10 Claims, 6 Drawing Sheets

CHARGING CRADLE

TECHNICAL FIELD

The present invention relates to a charging cradle and, in particular, to a charging cradle that prevents short-circuiting.

BACKGROUND

A charging cradle is an often included accessory for mobile electronic devices such as notebooks, cellphones, and portable music players. It is used to charge the rechargeable battery that powers the device. When the battery of the portable device is depleted, the user of such device places the device containing the rechargeable battery (or the battery itself) into the cradle. When the charging contact of the device mates with the charging contact of the cradle, recharging begins. One of the shortcomings of current charging cradle is that the charging contact of the charging cradle may come into contact with the housing of the device (or the battery) as the device (or the battery) is being inserted into the cradle. If the housing of the device (or the battery) is a conductive material, then the charging circuit in the charging cradle may be short-circuited.

A charging cradle that prevents short-circuiting would thus be highly desirable.

BRIEF DESCRIPTION OF THE DRAWINGS

These and other features of the present technology will become more apparent from the following description in which reference is made to the appended drawings wherein.

DETAILED DESCRIPTION

Figure 1:
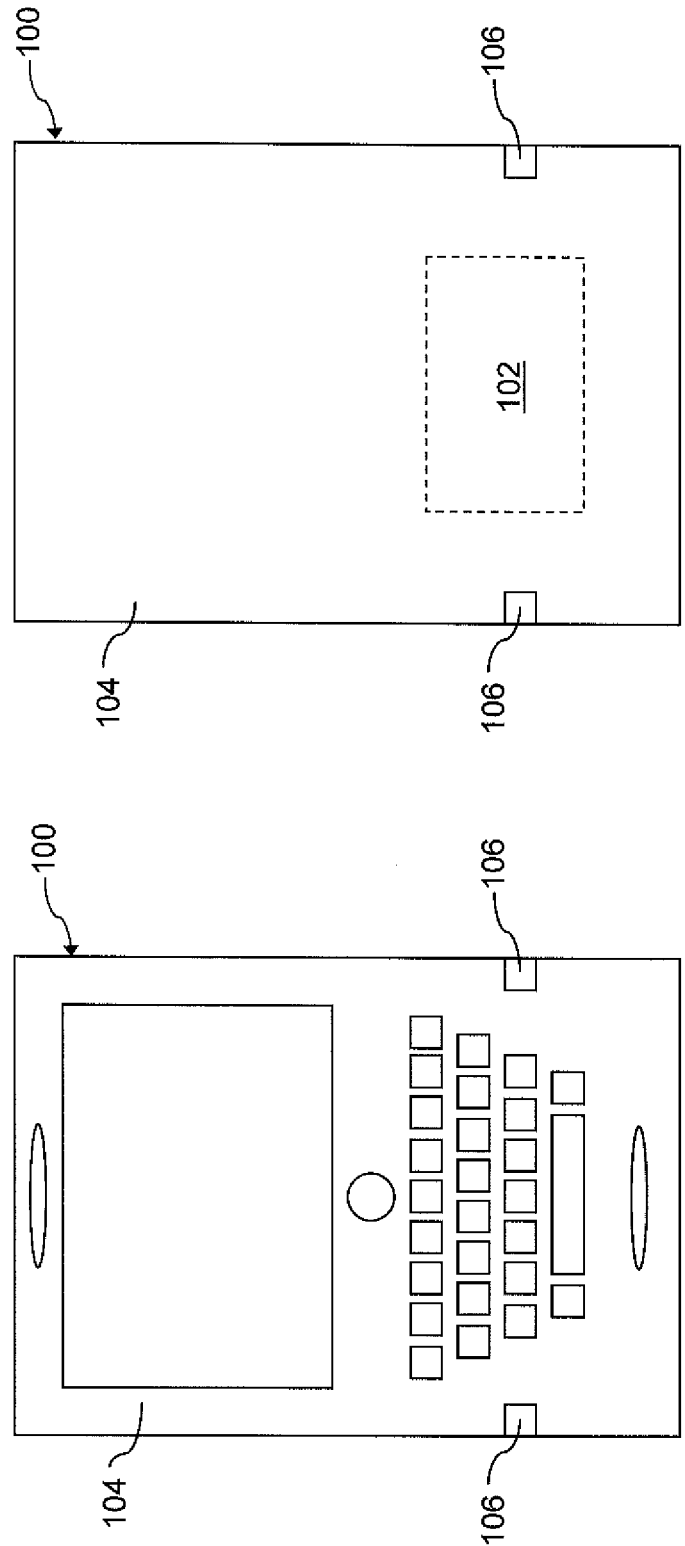
FIG. 1A is a front view of a rechargeable medium for use with the present technology.
FIG. 1B is a back view of the rechargeable medium of FIG. 1A.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this technology belongs.

It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

Accordingly, an aspect of the present technology is a charging cradle for a rechargeable medium having a charging contact. In this embodiment, the charging cradle includes a cradling-body, which includes a receiving area shaped to receive the rechargeable medium; a charging circuit having a charging and a non-charging to state; a charging contact electrically coupled to the charging circuit and positioned to be alignable with the charging contact of the rechargeable medium; and a switch coupled to the cradling-body for interacting with the rechargeable medium to place the charging circuit in the charging state or the non-charging state. When the rechargeable medium is fully inserted into the receiving area such that the charging contact of the rechargeable medium is aligned with the charging contact of the cradling-body, the rechargeable medium, via the switch, places the charging circuit in the charging state, and when the rechargeable medium is not fully inserted, the switch places the charging circuit in the non-charging state to prevent short-circuiting of the charging circuit In another embodiment, the charging cradle includes a charging circuit having a charging state and a non-charging state; an actuator pivotally mounted to the cradling-body, the actuator having a first end and a second end with the first end being positioned in the receiving area for interacting with the rechargeable medium; and a charging contact electrically coupled to the charging circuit and coupled to the second end of the actuator. When the rechargeable medium is fully inserted into the receiving area such that the charging contact of the rechargeable medium aligns with the charging contact of the charging cradle, the rechargeable medium urges the second end of the actuator, via the first end of the actuator, to place the charging circuit in the charging state, and when the rechargeable medium is not fully inserted, the actuator places the charging circuit in the non-charging state to prevent short-circuiting of the charging circuit.

In a further embodiment, the charging cradle includes a charging circuit having a charging and a non-charging state, the charging circuit comprising an electrical switch; a charging contact electrically coupled to the charging circuit and coupled to the charging cradle and positioned to protrude into the receiving area; and an actuator coupled to the cradling-body, the actuator having a first end and a second end, the first end of the actuator positioned in the receiving area and the second end of the actuator positioned such that the electrical switch is closeable and openable by the second end of the actuator. When the rechargeable medium is fully inserted into the receiving area such that the charging contact of the rechargeable medium aligns with the charging contact of the charging cradle, the rechargeable medium urges the second end of the actuator, via the first end of the actuator, to close the electrical switch to place the charging circuit in the charging state, and when the rechargeable medium is not fully inserted, the actuator places the charging circuit in the non-charging state, by opening the electrical switch, to prevent short-circuiting of the charging circuit.

The details and particulars of the technology will now be described below, by way of example, with reference to the attached drawings.

Referring to FIGS. 1A and 1B, a rechargeable medium 100 with a rechargeable battery 102 is illustrated. The rechargeable battery 102 may be encased in a housing 104 of the rechargeable medium 100. While the rechargeable medium 100 is depicted as having generally the proportions of a smart phone, it may be other portable devices including laptops, tablets, personal entertainment devices or other portable devices with a battery. Moreover, the rechargeable medium 100 may simply be the battery of the portable device. By recharging only the battery of the portable device, advantageously, the user of the portable device would be able to continue using the device with a spare battery.

The rechargeable medium 100 has a charging contact 106 through which the rechargeable medium 100 may be recharged. While the rechargeable medium 100 is depicted as having two charging contacts 106, it is understood that the rechargeable medium 100 may have one or more charging contacts 106.

Figure 2:
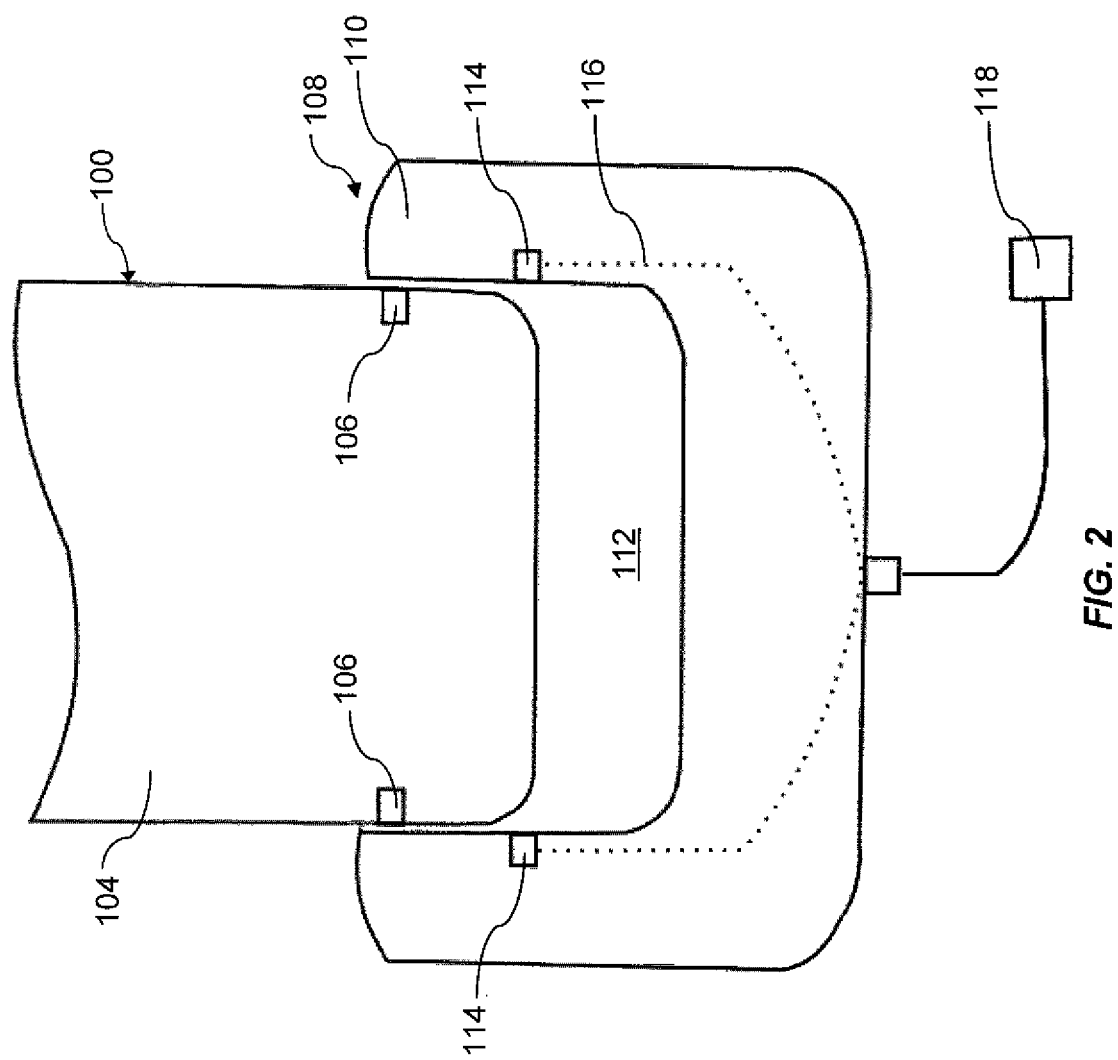
FIG. 2 is a front view of the rechargeable medium of FIGS. 1A and 1B and a charging cradle implementing the current technology.

Turning to FIG. 2, the rechargeable medium 100 may be recharged using a charging cradle 108 having a cradling-body 110. While the charging cradle 108 is depicted as having generally the proportions of a cradle for a smartphone or a portable entertainment device, it is understood that the cradle may be other charging devices such as a docking station for a notebook or a tablet. The cradling-body 110 has a receiving area 112 shaped to receive the rechargeable medium 100. The cradling-body 110 further has a charging contact 114 for charging the rechargeable medium 100. While the charging contact 114 is depicted as having two charging contacts 114, it is understood that the cradling-body 110 may have one or more charging contacts 114. The charging contact 114 is electrically coupled to the charging circuit 116, which may be coupled to a power source 118. To prevent short-circuiting of the charging circuit 116 while the rechargeable medium 100 is being inserted into the receiving area 112 of the cradling-body 110, a switch is included in the cradling-body 110 (specific implementation shown in FIGS. 3 and 4 and discussed below). The switch interacts with the rechargeable medium 100 to place the charging circuit 116 in either a charging state or a non-charging state.

Thus, when the rechargeable medium 100 is fully inserted into the receiving area 112 of the cradling-body 110 such that the charging contact 106 of the rechargeable medium 100 is aligned with the charging contact 114 of the cradling-body 110, the switch is positioned to place the charging circuit 116 in the charging state. Otherwise, the switch is positioned to place the charging circuit 116 in the non-charging state.

The specific implementations of the charging cradle 108 will now be described below.

Charging Cradle Using a Mechanical Switch

Figure 3A:
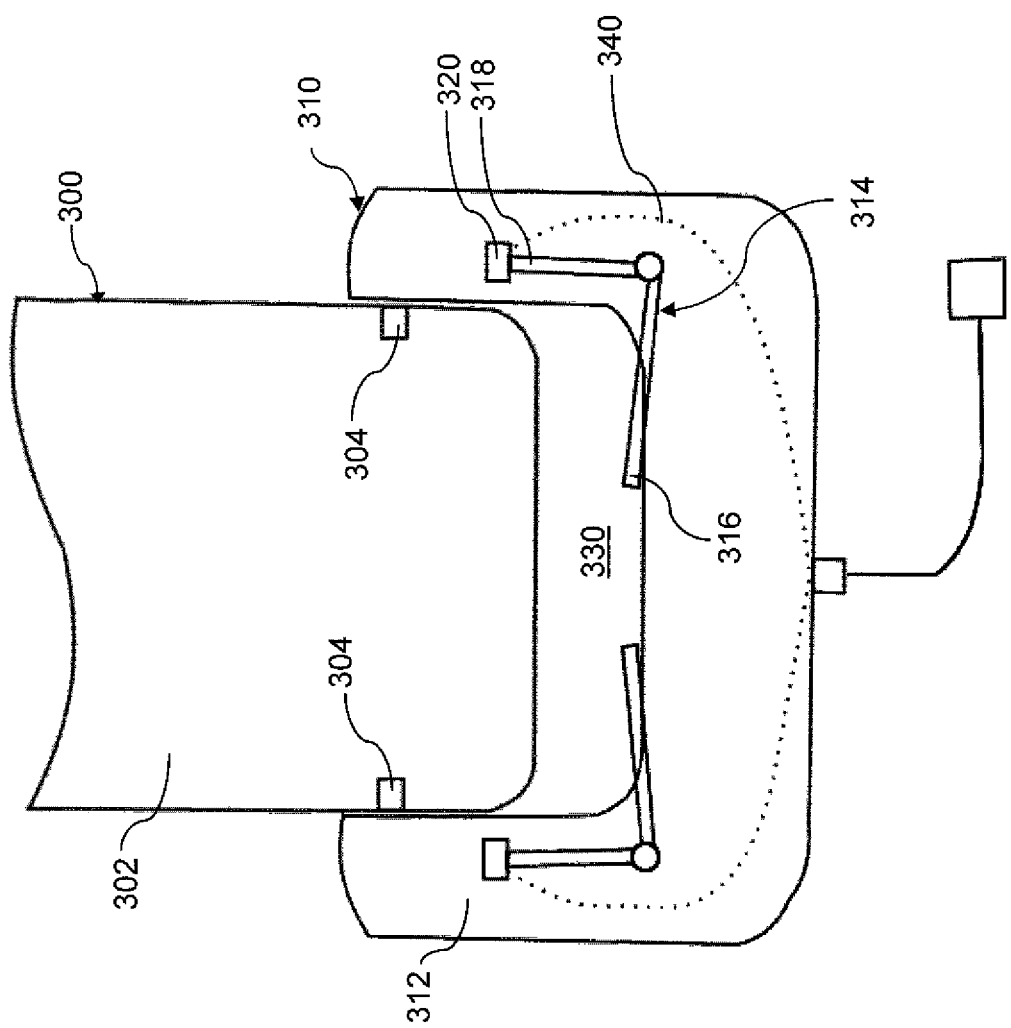
FIG. 3A is a front view of the rechargeable medium of FIGS. 1A and 1B being inserted into a charging cradle implementing an embodiment of the current technology, the charging circuit of the charging cradle being in a non-charging state.
Figure 3B:
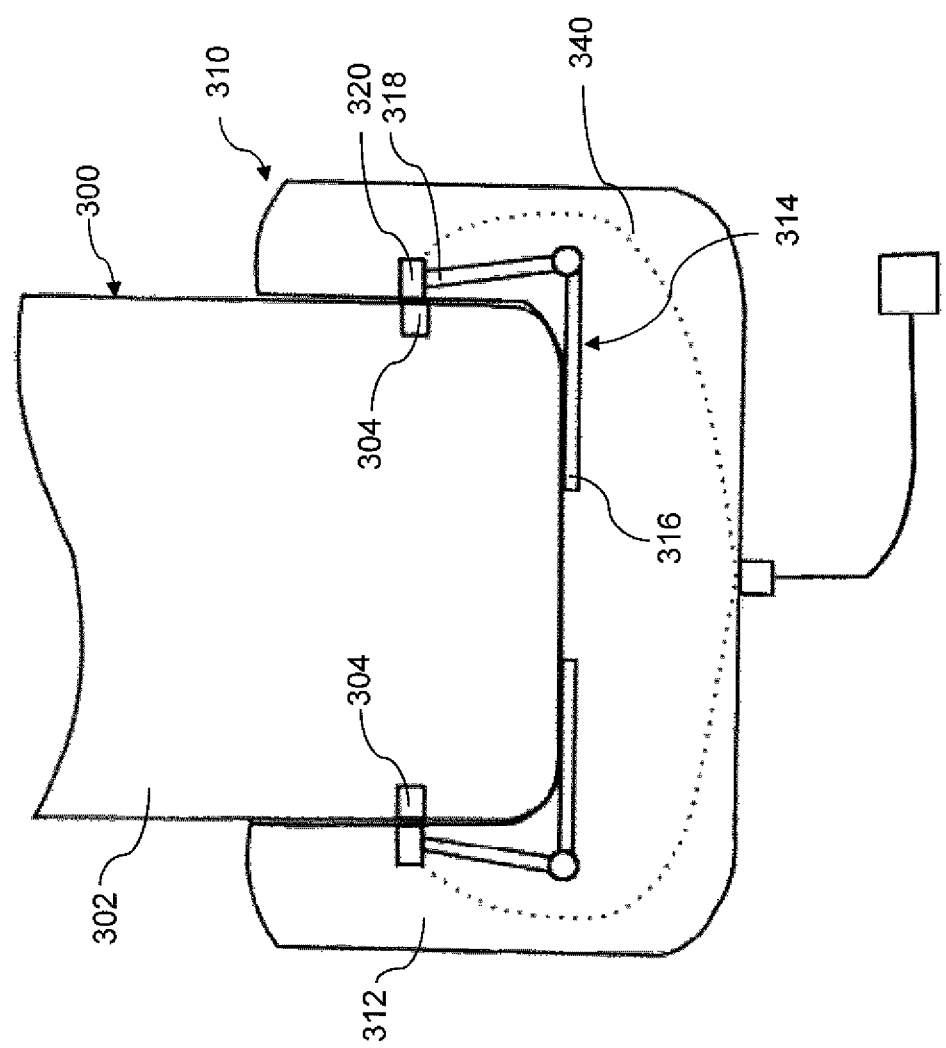
FIG. 3B is a front view of the rechargeable medium of FIGS. 1A and 1B being charged by the charging cradle of FIG. 3A when the charging circuit of the charging cradle is in a charging state.

In FIGS. 3A and 3B, there is shown an implementation of the present technology. In this implementation, the charging cradle 310 has a cradling-body 312 with a switch in the form of an actuator 314 that is pivotally mounted to the cradling-body 312. While in FIGS. 3A and 3B, the charging cradle 310 is depicted with two actuators 314, it is understood that the charging cradle 310 may have one or more actuators 314.

The actuator 314 has a first end 316 and a second end 318. The first end 316 is positioned in the receiving area 330 to interact with the rechargeable medium 300 and the second end 318 of the actuator 314 is coupled to the movable charging contact 320. As shown in FIGS. 3A and 3B, the charging contact 320 is movable to mate with the charging contact 304 of the rechargeable medium 300. In FIG. 3B, the charging contact 320 of the charging cradle 310 is electrically coupled to the charging contact 304 of the rechargeable medium 300. When the rechargeable is medium 300 is not fully inserted into the receiving area 330 (or the rechargeable medium 300 is not present), the charging contact 320 is moved by the actuator 314 to electrically decouple itself from the charging contact 304 of the rechargeable medium 304, as shown in FIG. 3A.

Thus, the state of the charging circuit 340 is determined by the position of the actuator 314, which is influenced by the rechargeable medium 300. In FIG. 3A, where the rechargeable medium 300 is not fully inserted into the receiving area 330 (or the rechargeable medium 300 is not present), the actuator 314 is biased such that the second end 318 of the actuator 314 places the charging contact 320 of the charging cradle 310 in the non-charging state. In this implementation, the non-charging state is created by moving the charging contact 320 inside the cradle-body 312. In this position, even if the housing 302 of the rechargeable medium 300 is a conductive material, the housing 302 cannot short-circuit the charging circuit 340.

When the rechargeable medium 300 is fully inserted into the receiving area 330, as shown in FIG. 3B, the rechargeable medium 300 interacts with the first end 316 of the actuator 314. In this particular implementation, as the charging contact 304 of the rechargeable medium 300 aligns with the charging contact 320 of the charging cradle 310, the rechargeable medium 300 urges the first end 316 of the actuator 314. Because the actuator 314 is pivotally mounted to the cradling body 312, the movement of the first end 314 causes the second end 318 of the actuator 314 to move toward and protrude out into the receiving area 330. When the rechargeable medium 300 is fully inserted into the receiving area 330, the second end 318 of the actuator 314, along with the charging contact 320, is positioned such that the charging contact 320 of the charging cradle 310 is electrically coupled to the charging contact 304 of the rechargeable medium 300. Once electrically coupled, the charging circuit 340 begins to charge the rechargeable medium 300. In effect, the rechargeable medium 300 urges the second end 318 of the actuator 314, via the is first end 316, to place the charging circuit 340 in the charging state.

Thus, through the interaction between the rechargeable medium 300 and the actuator 314, the charging cradle 310 is able to prevent short-circuiting of the charging circuit 340. Only when the rechargeable medium 300 is fully inserted into the receiving area 330, the charging contact 320 of the charging cradle 310 would protrude out of the cradle-body 312 to electrically couple with the charging contact 304 of the rechargeable medium 300. When the rechargeable medium 300 is not fully inserted into the receiving area 330 or when the rechargeable medium 300 is not present, the charging contact 320 is retracted into the cradle-body 312 by the actuator 314. As a result, short-circuiting of the charging circuit 340 is prevented.

Charging Cradle Using an Electro-Mechanical Switch

Figure 4A:
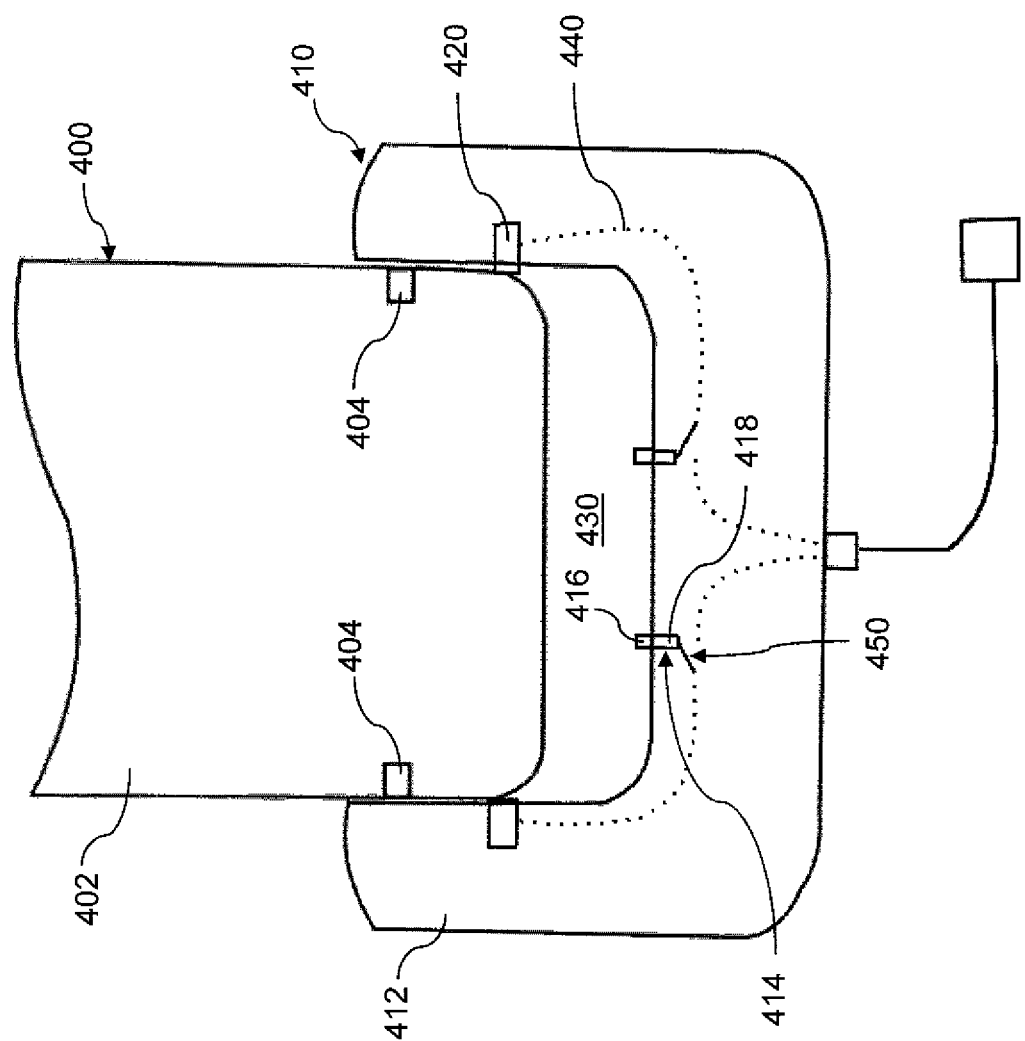
FIG. 4A is a front view of the rechargeable medium of FIGS. 1A and 1B being inserted into a charging cradle implementing another embodiment of the current technology, the charging circuit of the charging cradle being in a non-charging state.
Figure 4B:
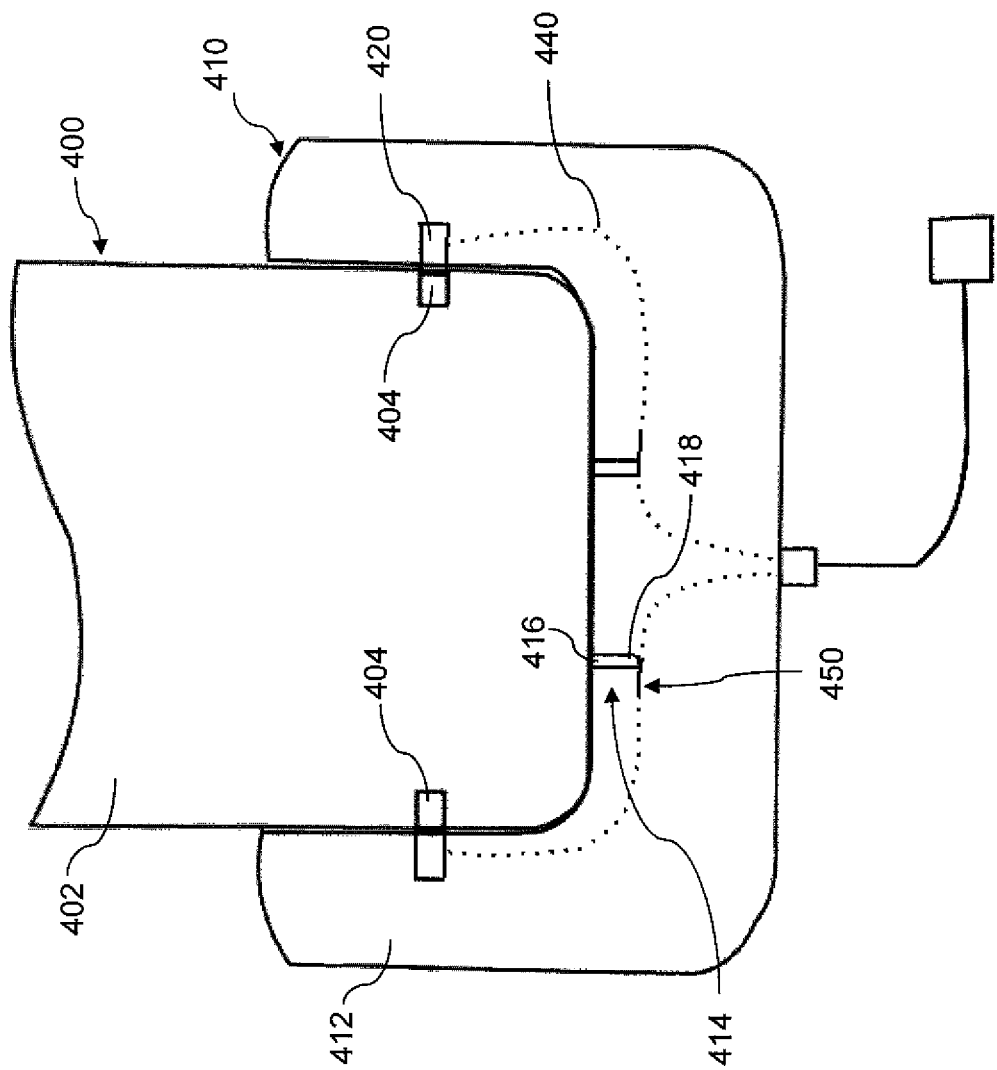
FIG. 4B is a front view of the rechargeable medium of FIGS. 1A and 1B being charged by the charging cradle of FIG. 4A when the charging circuit of the charging cradle is in a charging state.

A further implementation of the present technology is shown in FIGS. 4A and 4B. The charging cradle 410 has a cradling-body 412 with a fixed charging contact 420. The fixed charging contact 420 protrude into the receiving area 430 such that when the rechargeable medium 400 is fully inserted into the receiving area 430, as shown in FIG. 4B, the fixed charging contact 420 is able to electrically couple with the charging contact 404 of the rechargeable medium 400.

The charging cradle 410 further includes a switch in the form of an actuator 414. The actuator 414 has a first end 416 and a second end 418. The first end 416 is positioned in the receiving area 430 to interact with the rechargeable medium 400. The second end 418 of the actuator 414 is positioned such that the electrical switch 450 is openable and closeable by the second end 418. The electrical switch 450, in conjunction with the actuator 414, places the charging circuit in a charging state or a non-charging state. While in FIGS. 4A and 4B, the charging cradle 410 is depicted as having two actuators 414 and two corresponding electrical switches 450, one or more actuators 414 and electrical switches 450 may be included in the charging cradle 410.

When the rechargeable medium 400 is not fully inserted into the receiving area 430, as shown in FIG. 4A, the actuator 414 is biased to place the electrical switch 450 in the electrically open position. In this position, the charging circuit 440 is in a non-charging state. Thus, even if the housing 402 is a conductive material, the charging circuit 440 is prevented from being short-circuited. By contrast, without the actuator 414 and the electrical switch 450, the conductive material of the housing 402 would complete the charging circuit 440 without a load (i.e. battery) and thus, the charging circuit 440 would be short-circuited.

As the rechargeable medium 400 is slid into the receiving area 430, the rechargeable medium 400 starts to urge the first end 416 of the actuator 414. The movement of the first end 416 translates into a movement of the second end 418, which is positioned to close or open the electrical switch 450. When the rechargeable medium 400 is fully inserted into the receiving area 430, the actuator 414 forces the electrical switch 450 closed. Since, at this position, the charging contact 404 of the rechargeable medium 400 is electrically coupled to the charging contact 420 of the charging cradle 410, as shown in FIG. 4B, the charging circuit 440 starts to conduct electricity and in turn, charges the rechargeable medium 400. In effect, the rechargeable medium 400 urges the second end 418 of the actuator 414, via the first end 416, to place the charging circuit 440 in the charging state.

While the charging cradle has been described in terms of specific implementations and configurations, further modifications, variations, modifications and refinements may be made without departing from the inventive concepts presented herein. For example, while the switch has been described with respect to a mechanical and an electro-mechanical implementation, it will be appreciated that other switches, such as a magnetic switch, that interact with the rechargeable medium may be possible without departing from the scope of the invention as defined in the claims. In an implementation using a magnetic switch, when the rechargeable medium is fully inserted into the receiving area of the charging cradle, the magnetic switch would be induced by the rechargeable medium to place the charging circuit in the charging state. Otherwise, the charging circuit would be in the non-charging state. The scope of the exclusive right sought by the Applicant(s) is therefore intended to be limited solely by the appended claims.

What is claimed is:

1. A charging cradle for a rechargeable medium with a charging contact, the charging cradle having a receiving area for receiving the rechargeable medium, the charging cradle comprising:
    a base comprising first and second opposing side walls connected to a bottom portion of the base, wherein the receiving area is located between the first and second opposing side walls; and
    an actuator comprising a first arm coupled to a second arm having a charging contact, the first and second arms coupled together at a pivotal connection to the base, the actuator pivotable between:
        a non-charging state wherein a portion of the first arm extends into the receiving area and the charging contact of the second arm is retracted from the receiving area; and
        a charging state wherein the first arm is urged out of the receiving area by the rechargeable medium and the charging contact of the second arm extends into the receiving area to make contact with a charging connecter of the rechargeable medium.

2. The charging cradle according to claim 1, further comprising:
    a charging circuit coupled to the charging contact of the second arm and a power source.

3. The charging cradle according to claim 1, wherein the charging contact of the rechargeable medium is on a side surface of the rechargeable medium.

4. The charging cradle according to claim 1, wherein the receiving area is shaped to cradle the rechargeable medium.

5. The charging cradle according to claim 1, adapted to a rechargeable medium comprising two charging contacts.

6. The charging cradle according to claim 1, adapted to a rechargeable medium which is a mobile electronic device.

7. The charging cradle according to claim 1, adapted to a rechargeable medium which is a battery.

8. The charging cradle according to claim 1, adapted to a rechargeable medium comprising a housing made of a conductive material.

9. The charging cradle according to claim 1, wherein the portion of the first arm extends into the receiving area from the bottom portion of the base.

10. The charging cradle according to claim 9, wherein the charging contact of the second arm extends into the receiving area from one of the first or second opposing side walls.

* * * * *